United States Patent [19]

Minor et al.

[11] 4,389,154
[45] Jun. 21, 1983

[54] TIME DELAY FOR A SEAT SWITCH ACTIVATED LOADER BOOM LOCK

[75] Inventors: Ray C. Minor, Leola; James W. Treichler, Lancaster; Carl E. Bohman, New Holland, all of Pa.

[73] Assignee: Sperry Corporation, New Holland, Pa.

[21] Appl. No.: 263,327

[22] Filed: May 13, 1981

[51] Int. Cl.³ .......................................... B60K 27/08
[52] U.S. Cl. .................................. 414/699; 414/719; 180/273
[58] Field of Search ............... 414/685, 713, 699, 719, 414/271; 180/273; 200/61.58; 307/9, 116

[56] References Cited

U.S. PATENT DOCUMENTS

| | | | |
|---|---|---|---|
| 2,606,626 | 8/1952 | Meyer | 180/273 |
| 3,500,946 | 3/1970 | Boyajian | 180/273 |
| 3,838,748 | 10/1974 | Gray et al. | 180/273 |
| 3,995,761 | 12/1976 | Hurlburt | 414/713 |
| 4,059,196 | 11/1977 | Uchino et al. | 180/273 X |
| 4,172,980 | 10/1979 | Hsieh et al. | 307/9 |

Primary Examiner—Robert J. Spar
Assistant Examiner—Terrance L. Siemens
Attorney, Agent, or Firm—Larry W. Miller; Frank A. Seemar; Darrell F. Marquette

[57] ABSTRACT

A time delay device for the seat interlock mechanism on a skid-steer loader is disclosed wherein the boom structure will not be rendered inoperable for vertical movement, until the passage of a short predetermined period of time after the seat switch has indicated that the operator has left the loader seat. A solenoid valve is operable to stop the flow of fluid to the hydraulic cylinders moving the boom structure along a generally vertical path. A seat switch connected in the electrical circuit to the solenoid valve activates the solenoid valve to stop the fluid flow if the operator leaves the loader seat. The time delay device includes a capacitor, a resistor and a diode in series-parallel with both the source of electrical current and the solenoid valve and prevents the solenoid valve from restricting the flow of fluid through the hydraulic circuit to the boom lift cylinders for a short period of time after the seat switch has indicated that the operator has left the seat.

6 Claims, 8 Drawing Figures

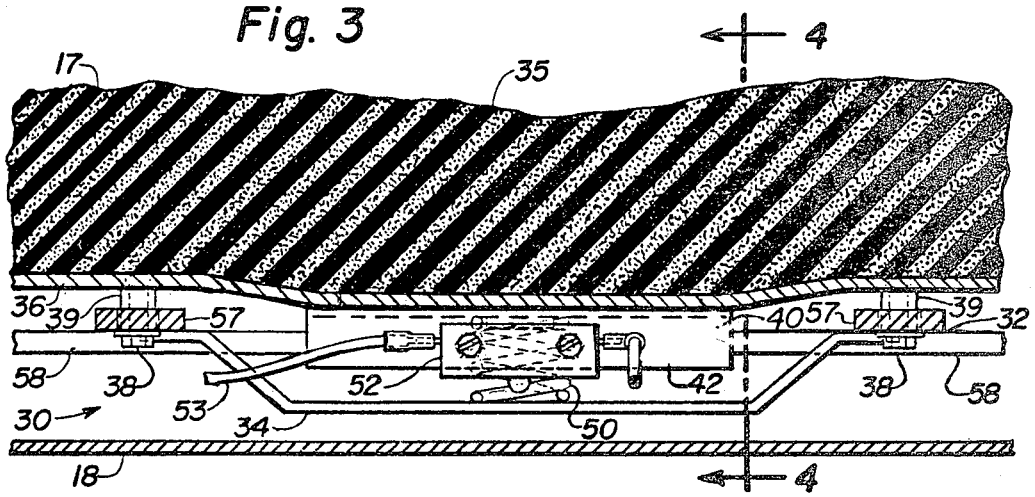
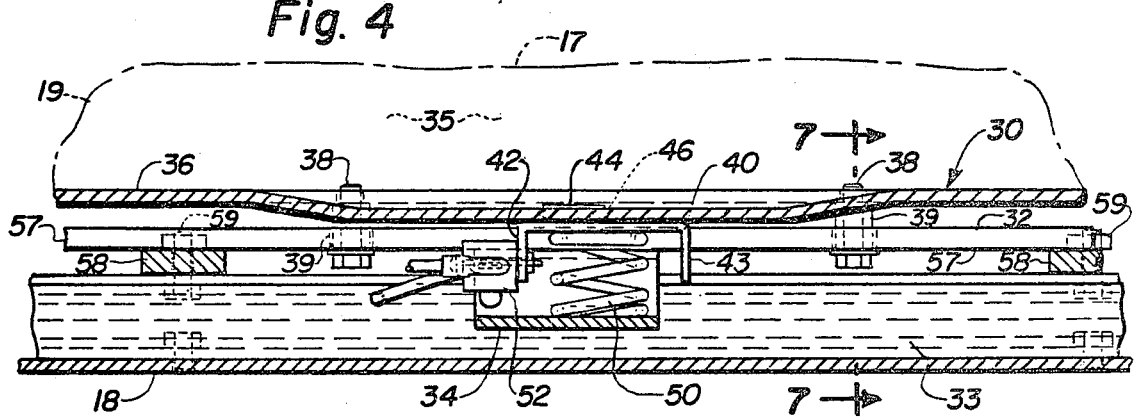
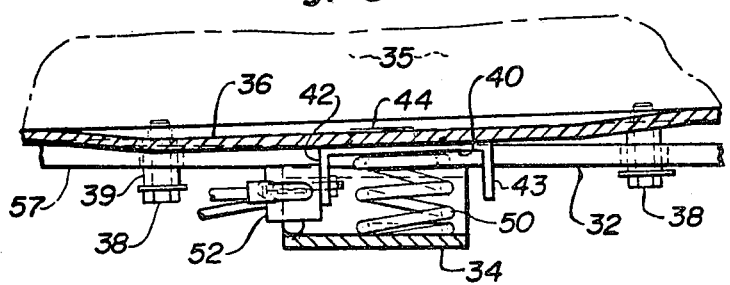
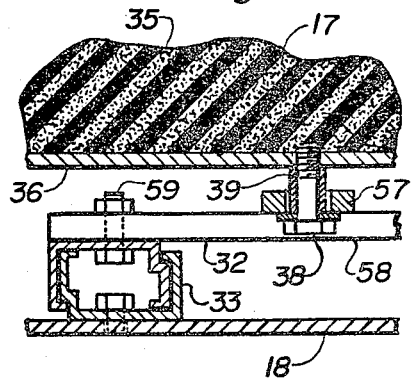
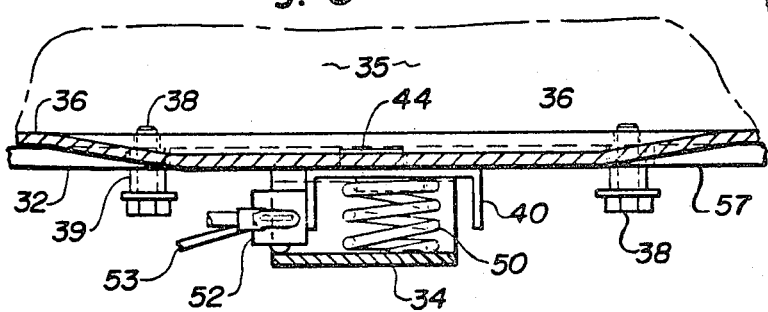

TIME DELAY FOR A SEAT SWITCH ACTIVATED LOADER BOOM LOCK

BACKGROUND OF THE INVENTION

The present invention relates generally to loaders and, more particularly, to a time delay for a seat interlock mechanism for a loader boom lock which will permit the boom structure to move freely for a short period of time after the seat switch senses that the operator has left the loader seat.

Because of the generally rough operating conditions of a skid-steer loader, it has been found that the operator will occasionally bounce up and down off his seat. This bouncing movement, even though the operator has not actually left the seat, causes the seat switch to respond as though the operator has left the loader seat and will result in the boom lock, such as a solenoid valve in the hydraulic circuit to the boom lift cylinders, being activated.

A series of up and down bouncing movements by the operator would cause the boom lock device to alternate between an activated condition and an unactivated condition and result in the boom structure itself bouncing up and down to impose further vibrations on the loader. Accordingly, it would be desirable to provide a seat interlock mechanism which would compensate for the up and down bouncing movements of the operator during operation of the loader without locking the boom structure, yet be operable to lock the boom structure when the operator has actually left his seat.

SUMMARY OF THE INVENTION

It is an object of this invention to overcome the aforementioned disadvantages of the prior art by providing a time delay device for a seat interlock mechanism which will permit the boom structure to move for a short period of time after the seat switch senses that the operator has left the loader seat.

It is another object of this invention to provide a time delay device to prevent an up and down bouncing movement of the operator in the loader seat from actuating the boom lock mechanism to prevent the boom structure from being temporarily prevented from moving vertically.

It is a feature of this invention to permit the seat interlock mechanism to activate the boom lock mechanism when the operator has left the loader seat for a predetermined period of time.

It is still another object of this invention to provide a time delay device that will keep a solenoid valve open for a short period of time after the seat switch has been opened.

It is a further object of this invention to provide a time delay device that will charge itself rapidly when the seat switch is returned to the on position.

It is a still further object of this invention to provide a time delay device that can be encapsulated with epoxy and mounted at a convenient place on the loader.

It is an advantage of this invention to provide a time delay device, utilizing a capacitor, that will minimize the rating of the capacitor necessary to keep the solenoid valve open for a predetermined length of time.

It is a further advantage of this invention that a lightweight operator will be able to operate the loader even though he is more subject to a bouncing movement on the operator'seat during operation of the loader than a heavier operator.

It is a still further object of this invention to provide a time delay device for a seat interlock mechanism to permit the boom structure to move for a short period of time after the seat switch senses that the operator has left the loader seat, which is durable in construction, inexpensive of manufacture, carefree of maintenance, facile in assemblage, and simple and effective in use.

These and other objects, features and advantages are accomplished according to the instant invention by providing a time delay device for the seat interlock mechanism on a skid-steer loader wherein the boot structure will not be rendered inoperable for vertical movement until the passage of a predetermined period of time after the seat switch has indicated that the operator has left the loader seat. A solenoid valve is operable to stop the flow of fluid to the hydraulic cylinders moving the boom structure along a generally vertical path. A seat switch connected in the electrical circuit to the solenoid valve activates the solenoid valve to stop the fluid flow if the operator leaves the loader seat. The time delay device includes a capacitor, a resistor and a diode in series-parallel with both the source of electrical current and the solenoid valve and permit the solenoid valve to allow an unrestricted flow of fluid through the hydraulic circuit to the boom lift cylinders for a short period of time after the seat switch has indicated that the operator has left the loader seat.

BRIEF DESCRIPTION OF THE DRAWINGS

The advantages of this invention will become apparent upon consideration of the following detailed description of the invention, especially when taken in conjunction with the accompanying drawings wherein:

FIG. 3 is a partial cross sectional view of the operator's seat taken along lines 3—3 of FIG. 2 and showing a front elevational view of the instant invention with the seat being empty;

FIG. 4 is a partial cross sectional view of the operator's seat corresponding to lines 4—4 of FIG. 3, the seat being shown in the empty state;

FIG. 5 is a partial cross sectional view corresponding to FIG. 4 and showing the position of the components of the instant invention when an operator is sitting adjacent the forward edge of the operator's seat;

FIG. 6 is a partial cross sectional view corresponding to FIG. 4, showing the position of the components of the instant invention corresponding to the weight of the operator being substantially centered on the operator's seat;

FIG. 7 is a cross sectional view taken along lines 7—7 of FIG. 4 and showing the bolts attaching the second seat frame member to the first seat frame member.

DETAILED DESCRIPTION OF THE PREFERRED EMBODIMENT

Figure 1:
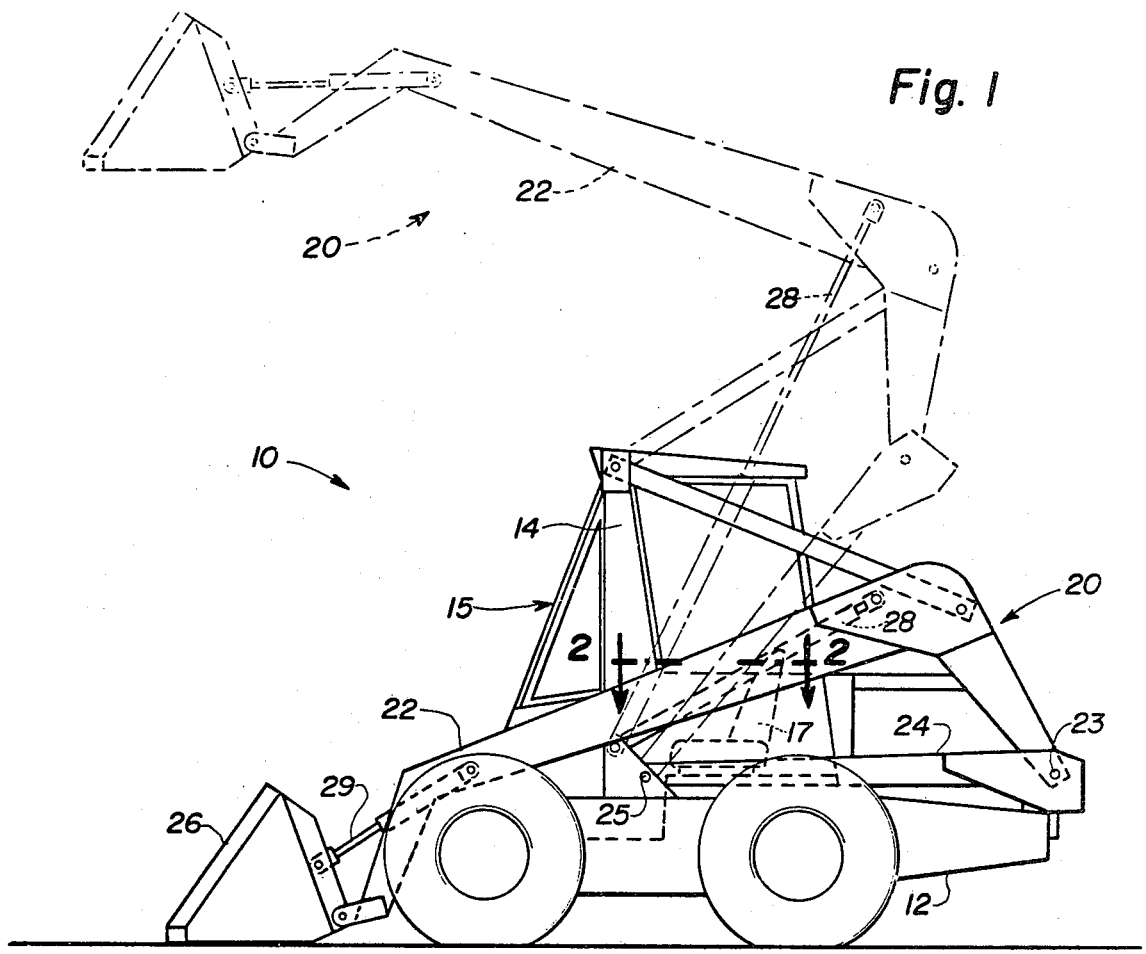
FIG. 1 is a side elevational view of a skid-steer loader incorporating the principals of the instant invention.

Referring now to the drawings and, particularly, to FIG. 1, a side elevational view of a skid-steer loader can be seen. Although the skid-steer loader depicted in FIGS. 1–8 is of the type described in detail in U.S. Pat. No. 3,215,292, issued to L. M. Halls on Nov. 2, 1965, one skilled in the art should readily realize that the principals of the instant invention are not restricted to this particular type of loader.

The loader 10 includes a wheeled frame 12 and spaced apart side walls 14 disposed generally vertically and defining an operator's compartment 15 therebetween. A seat 17 is mounted within the operator's compartment 15 on a floor member 18 extending generally between the spaced apart side walls 14. The boom structure 20 is basically comprised of a pair of spaced apart upper boom arms 22 pivotally connected at pivot 23 to a pair of corresponding lower boom arms 24. The lower boom arms 24 are, in turn, pivotally connected at pivot 25 to the frame 12. Generally, a working tool, such as the bucket 26, is connected to the upper boom arms 22 forwardly of the loader 10. The boom structure 20 is pivoted about 25 and moved in a generally vertical direction, as shown in phantom in FIG. 1, by a pair of hydraulically actuated lift cylinders 28 interconnecting the frame 12 and the upper boom arms 22. The position of the bucket 26 relative to the upper boom arms 22 can be controlled by manipulation of the hydraulic cylinders 29 interconnecting the bucket 26 and the upper boom arms 22.

Figure 2:
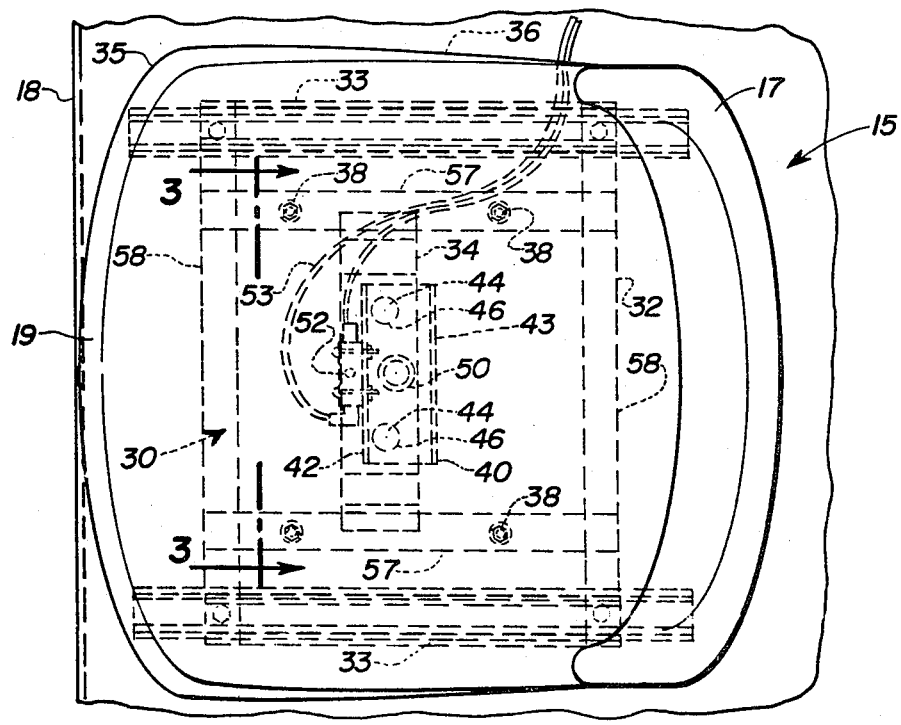
FIG. 2 is a partial cross sectional view of the loader through the operator's compartment taken along lines 2—2 of FIG. 1, showing the operator's seat in top plan view.

Referring now to FIGS. 2, 3 and 4, the details of the instant invention can readily be seen. The seat frame 30 includes a first seat frame member 32 connected to adjusting rails 33 mounted on the floor 18. The adjusting rails 33 permit the seat 17 to be adjusted in a fore-and-aft direction at the convenience of the operator. The first frame member 32 also includes an actuator plate 34 spaced above the floor 18, the function of which will be described in detail below. The seat cushion 35 is affixed to the second seat frame member 36 which, in turn, is connected to the first seat frame member 32 by a plurality of bolts 38 slidably received through the first seat frame member 32.

A U-shaped bracket 40 is positioned adjacent the second seat frame member 36 in a downwardly facing manner, as best seen in FIG. 4, such that the forward leg 42 is spaced above the actuator plate 34, while the rearward leg 43 is spaced rearwardly of the actuator plate 34. The bracket 40 is fixed into a position relative to the second seat frame member 36 by a protrusion 44 affixed to the bracket 40 and projecting through a weep hole 46 formed in the second seat frame member 36. The weep hole 46 provides a means for draining water from above the second seat frame member 36, as well as providing a means for fixing the position of the bracket 40 relative to the second seat frame member 46.

A spring 50 interposed between the bracket 40 and the actuator plate 34 forces the bracket 40 upwardly into position against the second seat frame member 36 such that the protrusion 44 is disposed within the weep hole 46. The spring 50 biases the second seat frame member 36 upwardly away from the first seat frame member 32 and, as such, is best positioned beneath the center of gravity of that portion of the seat 17 being biased upwardly by the spring 50. The spring 50 is of a size to support a weight at least as great as the weight of that portion of the seat being biased upwardly, so that the second seat frame member 36 is maintained in a spaced relationship to the first seat frame member 32 when the operator's seat is empty.

Figure 8:
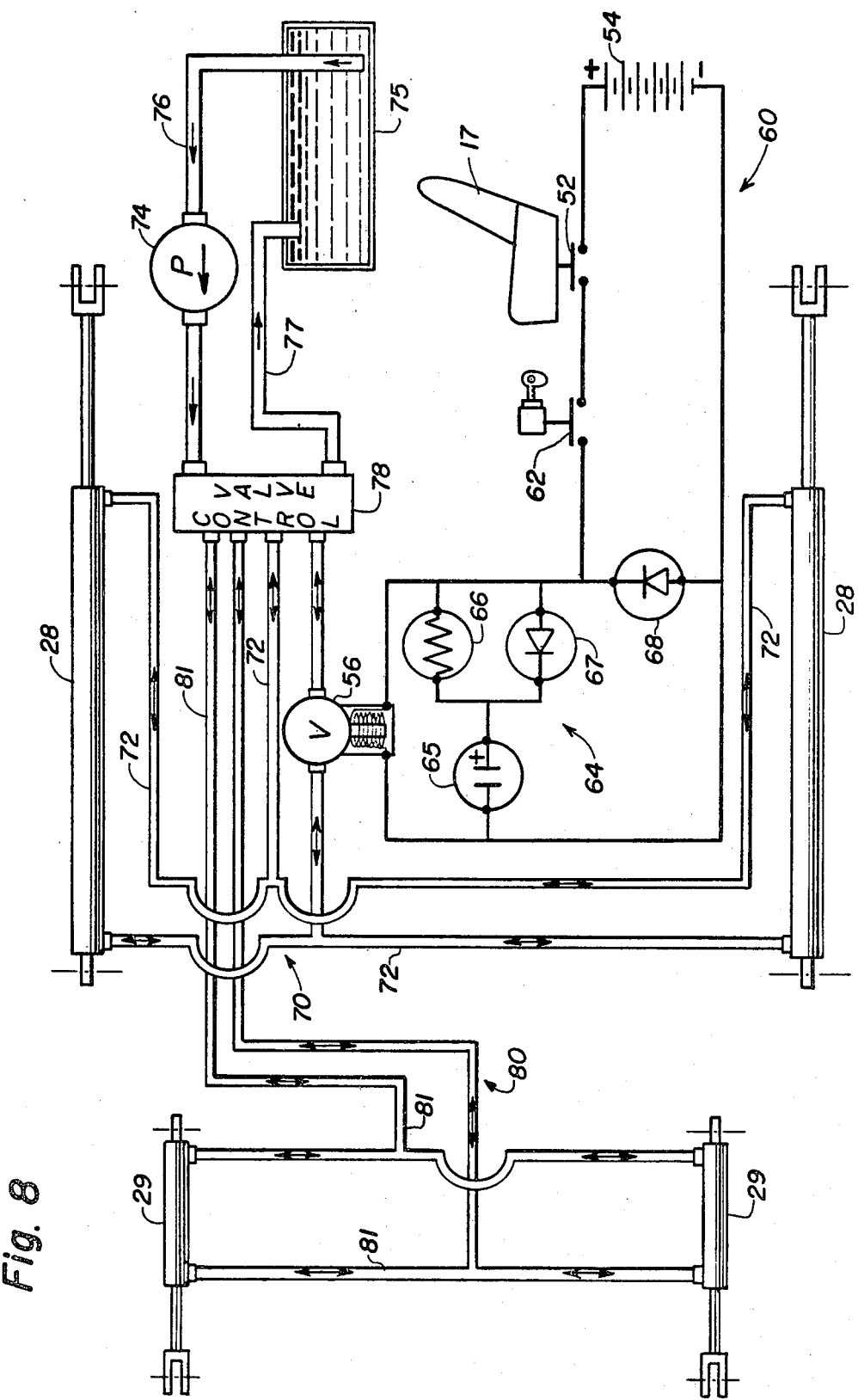
FIG. 8 is a schematic diagram of a portion of the hydraulic and electrical circuits of the skid-steer loader pertaining to the instant invention.

A switch 52 is affixed to the forward leg 42 of the bracket 40 and positioned immediately above the actuator plate 34. When a weight is placed in the seat 17 greater than that which the spring 50 can bias upwardly, the second seat frame member 36 moves into a first position adjacent to the first seat frame member 32, as generally seen in FIGS. 5 and 6, such that the switch 52 engages the actuator plate 34. When no weight is placed on the seat 17, the spring 50 biases the second seat frame member 36 into a second position, as seen generally in FIGS. 3 and 4, spaced from the first seat frame member 32, such that the switch 52 is spaced from the actuator plate 34. The wires 53 connected to the switch 52 form a part of the electrical circuit 60 interconnecting the source of electrical current 54 and a solenoid valve 56, as schematically shown in FIG. 8.

Referring now to FIGS. 5 and 6, the operation of the seat switch sensing the presence of an operator on the loader seat 17 can be seen. More particularly, FIG. 5 depicts the position of the various components when the operator is sitting near the forward edge 19 of the seat 17. The bolts 38 interconnecting the second seat frame member 36 and the first seat frame member 32 are positioned around the spring 50 and switch 52 in such as manner as to form a line on each side thereof. When the operator sits near the forward edge 19 of the seat 17 the bolts 38 forming a line rearwardly of the spring 50, serves somewhat as a pivot axis allowing the second seat frame member 36 to move into the first position adjacent said first seat frame member 32 and cause the switch 52 to become engaged with the actuator plate 34.

Similarly, when the weight of the operator is distributed rearwardly of the spring 50, the bolts 38 positioned forwardly of the spring 50 and forming a line forwardly thereof serves somewhat as a pivot axis, permitting the second seat frame member 36 to move into the first position adjacent the first seat frame member 32 and engage the switch 52 with the actuator plate 34. When the weight of the operator and the loader seat 17 is generally centered between the bolts 38 forwardly of the spring 50 and rearwardly of the spring 50, the bolts 38 slide through the first seat frame member 32 to permit the second seat member 36 to move generally linearly downwardly until the switch 52 engages the actuator plate 34. The first seat frame member 32 serves as a stop for the movement of the second seat frame member 36 so that the switch 52 engages the actuator plate 34 sufficiently to operate the switch 52 but not hard enough to damage the switch 52 by an impact upon the actuator plate 34.

Referring now to FIG. 7, a detail of the mounting of the second seat frame member 36 with the first seat frame member 32, which, in turn, is mounted to the floor 18 of the frame 12, can be seen. The bolt 38 is threaded into the second seat frame member 36 and slidably received through the first seat frame member 32 by means of a spacer 39. The first seat frame member 32 is composed of a series of linear bar-like members 57, 58 arranged at 90 degrees to each other and forming a box-like structure beneath the second seat frame member 36. The linear bar-like members 58 are connected to the adjusting rails 33 by means of bolts 59. As is well known in the art, the adjusting rails 33 is comprised of two members slidably connected to each other and connected to the floor 18 and the first frame member 58, respectively. As noted above, the adjusting rails 33 permit a fore-and-aft adjustment of the operator's seat 17.

Referring now to the schematic diagram of a portion of the hydraulic and electrical circuits of the skid-steer loader 10 as seen in FIG. 8, the operation of the seat interlock mechanism with the boom lock and time delay devices can be seen. In general, the electrical circuit 60 includes a source of electrical current 54 for operating the solenoid valve 56. The ignition switch 62 and the seat switch 52 are diagrammatically shown in the electrical circuit 60. The solenoid valve 56 is situated such that when both the ignition switch 62 and the seat switch 52 are closed to permit electrical current to flow from the source of electrical current 54 to the solenoid valve 56, the solenoid valve is opened to permit an unrestricted flow of fluid through the hydraulic circuit 70 to the boom lift cylinders 28. If either the ignition switch 62 or the seat switch 52 become moved to the open or off position, the flow of electrical current from the source of electrical current 54 to the solenoid valve 56 is interrupted and the solenoid valve assumes a second operating condition, wherein the flow of fluid through the hydraulic circuit 70 to the boom lift cylinders 28 is prevented, thereby locking the boom structure 20 in a fixed position.

During operation of the skid-steer loader 10, the operator may be bounced up and down in the seat 17, causing the seat switch 52 to become disengaged from the actuator plate 34 and, thereby, move into the open or off position. To prevent this bouncing movement from interrupting the operation of the boom structure 20 due to an interruption of the flow of fluid to the hydraulic circuit 70 by the solenoid valve 56, a time delay device 64 is connected to the electrical circuit 60 in parallel with both the source of electrical current 54 and the solenoid valve 56. The time delay device 64 comprises a passive electrical circuit including a capacitor 65 connected in parallel with the energy source 54. To restrict the flow of current from the capacitor 65 to the solenoid valve 56, in the event the switch 52 is temporarily placed in the open or off position and, thereby, interrupting the flow of current from the energy source 54, a resistor 66 is placed in series with the capacitor 65 such that both the capacitor 65 and the resistor 66 are in parallel with the energy source 54 and the solenoid valve 56. The provisions of the resistor 66 meters the discharge of current from the capacitor 65 and enables a capacitor 65 of smaller rating to be utilized. One skilled in the art will readily realize that the time delay device can utilize an active electrical circuit to accomplish the same function; however, the utilization of an active time delay device could conceivably fail in a manner to render the seat switch ineffective. Accordingly, a passive time delay device as described above is deemed preferable.

To permit the source of electrical current 54 to rapidly charge the capacitor 65, once both the ignition switch 62 and the seat switch 52 become closed or in the on position, a diode 67 is placed in series with the capacitor 65 and in parallel with the resistor 66. This arrangement of components permits a rapid flow of current from the energy source 54 through the diode 67 to charge the capacitor 65 while requiring that any discharge from the capacitor 65 to the solenoid valve 56 must be through the resistor 66. A second diode 68 is connected to the electrical circuit 60 in parallel with both the source of electrical current 54 and the solenoid valve 56 between the switches 52, 62 and the solenoid valve 56 to prevent arcing of electrical current over either of the switches 52, 62, when placed in the open or off position, by dissipating the energy stored in the solenoid valve 56.

For a solenoid valve having a resistance of approximately 8 ohms and a dropout voltage of approximately 1.5 volts, it has been found that a capacitor having a rating of 3,300 microfarads and 25 volts D.C. in combination with a 68 ohm, ¼ watt carbon resistor and a 1N4004 diode provides a time delay of approximately 0.3 seconds before an open switch 52 or 62 will effect a movement of the solenoid valve 56 to the second condition, whereby the flow of fluid through the hydraulic circuits 70 is prevented and the boom structure 20 rendered inoperative for any further vertical movement. Although not seen in the drawings, the capacitor 65, the resistor 66 and the diodes 67, 68 can be encapsulated in a plastic tube with a rigid epoxy and mounted on the frame 12 in a convenient location, such as adjacent the solenoid valve.

The hydraulic circuit 70 to the boom lift cylinders 28 includes a pair of supply lines 72 leading to each end of each of the hydraulic boom lift cylinders 28 for the supplying of fluid under pressure thereto. The pump 74 and the reservoir 75, schematically shown in FIG. 8, provide a supply of fluid under pressure to the control valve 78 through the supply line 76 and return line 77. The control valve 78 controls the direction of flow of fluid under pressure through the supply lines 72 to the boom lift cylinders 28. As is well known in the art, the extension and contraction of the length of the hydraulic cylinder 28 depends upon which end of the hydraulic cylinder fluid is supplied under pressure.

The hydraulic circuit 80 for the bucket cylinders 29 includes a pair of supply lines 81 leading between the control valve 78 and the bucket cylinders 29. Operation of the bucket cylinders 29 is well known in the art and is generally identical to the description noted above relative to the boom lift cylinders 28. By placing the solenoid valve 56 only within the hydraulic circuit 70 to the boom lift cylinders 28, an operator may continue to manipulate the position of the bucket 26 through manipulation of the hydraulic circuit 80, even though the seat switch 52 is in the open of off position and the boom lift cylinders are rendered inoperable for further vertical movement. One skilled in the art will readily realize that only a portion of the hydraulic and electrical circuits pertaining to the instant invention have been shown in this schematic diagram of FIG. 8. Other circuitry will allow the continued operation of other components of the skid-steer loader 10, other than the boom structure 20, even though the seat switch 52 is in the open or off position effecting an inoperation of the hydraulic lift cylinders 28.

It will be understood that changes in the details, material, steps and arrangement of parts which have been described and illustrated to explain the nature of the invention will occur to and may be made by those skilled in the art upon a reading of this disclosure within the principals and scope of the invention. The foregoing description illustrates the preferred embodiments of the invention. However, concepts, as based upon such description, may be employed in other embodiments without departing from the scope of the invention. Accordingly, the following claims are intended to protect the invention broadly as well as in the specific form shown herein.

Having thus described the invention, what is claimed is:

1. In a loader having a mobile frame including upwardly extending, laterally spaced side members; a boom structure pivotally mounted on said frame and moveable in a generally vertical path direction, said boom structure including a pair of boom arms generally vertically moveable along a path adjacent said sidewalls; first power means operatively associated with said boom structure for moving said arms along said path of movement; and an operator's compartment positioned between said sidewalls, the improvement comprising:

power interruption means operatively associated with said power means to selectively render said power means inoperative to vertically move said boom structure;

control means operatively connected to said power interruption means for selectively controlling the operation thereof to render said power means inoperative to vertically move said boom structure, said control means including an electrical circuit having a first switch manually moveable between an on position and an off position and a second switch operatively positioned to sense the presence of an operator within said operator's compartment, said second switch being positioned in an on position when an operator is sensed within said operator's compartment and in an off position when an operator is not sensed within said operator's compartment, said electrical circuit being connected to an energy source to provide energy to control said power interruption means, said power interruption means rendering said power means inoperative when either of said first and second switches are positioned in the off position; and time delay means operatively associated with said control means to prevent said power interruption means from rendering said power means inoperative for a predetermined period of time after said second switch becomes positioned in said off position, said time delay means including a capacitor connected to said electrical circuit in parallel with said energy source, a first diode connected to said electrical circuit in series with said capacitor and in parallel with a resistor, said capacitor providing a temporary source of electrical current to said power interruption means after said second switch has been moved to said off position, said first diode permitting the flow of current from said energy source to charge said capacitor and requiring the flow of current from said capacitor to flow to said power interruption means through said resistor.

2. The loader of claim 1 wherein said power means includes a hydraulic cylinder interconnecting said frame and one of said boom arms, a hydraulic circuit supplying fluid under pressure to said cylinder and a control valve for controlling the direction of flow through said hydraulic circuit to manipulate the length of said cylinder and effect a vertical movement of said boom structure, said power interruption means including a solenoid valve connected to said hydraulic circuit and being operable to prevent the flow of fluid through said hydraulic circuit for effecting the vertical movement of said boom structure.

3. The loader of claim 2 further having a seat mounted on said mobile frame within said operator's compartment, said second switch being mounted on said seat to sense when an operator is sitting on said seat, said second switch being in said on position when an operator is sensed to be sitting on said seat and in said off position when an operator is not sensed to be sitting on said seat, said energy source being a device for producing a flow of electrical current through said electrical circuit.

4. The loader of claim 3 wherein said control means further includes a second diode connected to said electrical circuit in parallel with said solenoid valve, said first and second switches being positioned in said electrical circuit between said second diode and said energy source, said second diode providing dissipation of electrical energy stored in said solenoid valve to minimize arcing of electrical current over one of said switches when said one switch is positioned in the off position.

5. The loader of claim 4 wherein said capacitor has a rating of 3,300 microfarad and 25 volts D.C., said resistor being a 68 ohm, ¼ watt carbon resistor, said first and second diodes being 1N4004 diodes, said predetermined period of time for said time delay means amounting to approximately 0.3 seconds when said solenoid valve has a resistance of approximately 8 ohms and a dropout voltage of approximately 1.5 volts.

6. The loader of claim 5 wherein said capacitor, said resistor and said first and second diodes are encapsulated in a plastic tube with a rigid epoxy.

* * * * *